A. G. Berin,

Attaching Sleigh-Bells,

No. 1,298, Reissued Apr. 8, 1862.

N. PETERS, PHOTO-LITHOGRAPHER, WASHINGTON, D. C.

UNITED STATES PATENT OFFICE.

ABNER G. BEVIN, OF CHATHAM, CONNECTICUT.

IMPROVED MODE OF ATTACHING SLEIGH-BELLS TO STRAPS.

Specification forming part of Letters Patent No. 15,366, dated May 22, 1856; Reissue No. 1,298, dated April 8, 1862.

*To all whom it may concern:*

Be it known that I, ABNER G. BEVIN, of Chatham, in the county of Middlesex and State of Connecticut, have invented a new and Improved Mode of Attaching Horse or Sleigh Bells to Straps; and I do hereby declare that the following is a full, clear, and exact description of the same, reference being had to the accompanying drawings, making a part of this specification, in which—

Figure 1:
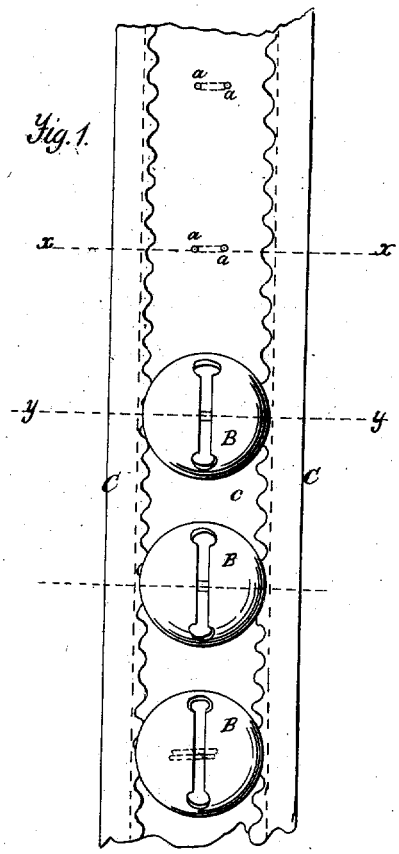
Figure 4:
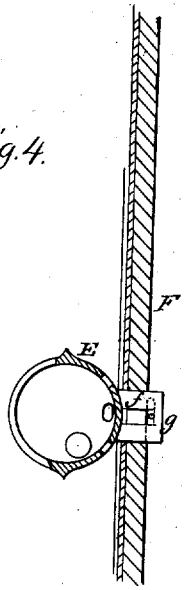
Figure 2:
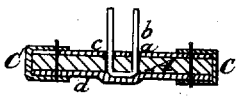
Figure 3:
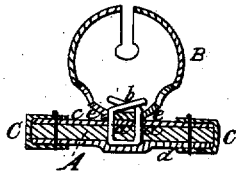

Figure 1 is a view of a portion of a strap with three bells attached to it according to my improved mode; Fig. 2, a transverse section of the same, *x x*, Fig. 1, showing the plane of section; Fig. 3, a transverse section of the same, *y y*, Fig. 1, showing the plane of section. Fig. 4 is a portion of a strap with a bell attached to it in the old or usual way.

Similar letters of reference indicate corresponding parts in the several figures.

My invention consists in attaching the bells to the straps by means of staples, rivets, bolts, or their equivalent, passing through the strap and bells, substantially as hereinafter shown and described.

To enable those skilled in the art to fully understand and construct my invention, I will proceed to describe it.

A, Figs. 2 and 3, represents the strap to which the bells B are attached. This strap is of the usual thickness, and the same as is now employed for a like purpose. The strap A is pierced with small holes *a* at equal distances apart, through which wire staples *b* are passed. The staples *b* also pass through the patent-leather cover *c* on the strap A, but do not pass through the lining *d*, which is attached to the inner side of the strap. (See Fig. 2.) C C represent the binding, which is stitched over each edge or side of the strap, cover, and lining, as shown in Figs. 2 and 3. B, Figs. 1 and 3, represents the bells. These bells are cast without shanks and merely have two holes, *e e*, drilled through them. The ends of these staples are bent over or clinched by means of small pliers, which are inserted through the holes in the bells, and the bells are thereby permanently secured to the strap. (See Fig. 3.) In the old method of attaching bells to straps, the bells E are cast with shanks *f*, which pass through holes in the strap F, and the shanks have wires *g* passing through them to secure the bells to the straps. (See Fig. 4.) In the old method it will be seen that the bells must be attached to the strap F before the lining is attached to it, and consequently the binding C C must be stitched over the edge or sides of the strap after the bells are on the strap. The stitching of the binding C, therefore, must be done by hand; a sewing machine cannot be used as the bells E are in the way, and, besides, they add so much weight to the strap that the feed mechanism of a sewing-machine is rendered inoperative. The strap F is also much weakened by the large holes made in it to receive the shanks *f*. By my improvement the binding C C may be stitched by a sewing-machine before the bells are attached to the strap, the staples *b* being put through the strap A, as described, and as I dispense with the shanks *f* now employed, a considerable saving in metal is effected. Thus I can make an ornamental strap much quicker than can now be done in the old mode of attaching bells to straps and with much less expense.

It will be seen from the above description that rivets or bolts might be used instead of the staples, but they, of course, would be an equivalent of the staples and effect precisely the same end when passed through the strap and bells and headed or secured either within the bells or at the back side of the strap, and it will also be seen that the invention is applicable to the securing of the open bells to straps as well as to the spherical ones.

Having thus described my invention, what I claim as new, and desire to secure by Letters Patent, is—

Securing sleigh bells to straps by means of staples, rivets, bolts, or their equivalent, passing through the strap and bells, substantially as described.

ABNER G. BEVIN.

Witnesses:

LIZZIE M. WELCH,

NATHL. C. SMITH.